United States Patent
Abu-Orf et al.

(10) Patent No.: US 7,037,433 B2
(45) Date of Patent: May 2, 2006

(54) METHODS FOR WATER AND WASTEWATER SLUDGE TREATMENT USING FLOC OR NETWORK STRENGTH

(75) Inventors: Mohammad Abu-Orf, Pittman, NJ (US); Banu Ormeci, Durham, NC (US)

(73) Assignees: Duke University, Durham, NC (US); Stranco, Inc., Bradley, IL (US)

( * ) Notice: Subject to any disclaimer, the term of this patent is extended or adjusted under 35 U.S.C. 154(b) by 0 days.

(21) Appl. No.: 11/049,388

(22) Filed: Feb. 2, 2005

(65) Prior Publication Data

US 2005/0127008 A1    Jun. 16, 2005

Related U.S. Application Data

(62) Division of application No. 10/461,276, filed on Jun. 13, 2003, now Pat. No. 6,964,737.

(60) Provisional application No. 60/389,039, filed on Jun. 14, 2002.

(51) Int. Cl.
    C02F 11/14    (2006.01)

(52) U.S. Cl. ............ 210/709; 73/54.31; 210/727; 210/739

(58) Field of Classification Search .......... 210/709, 210/726, 727, 739, 96.1, 138, 143, 145; 73/54.01, 73/54.28, 54.31, 61.41
See application file for complete search history.

(56) References Cited

U.S. PATENT DOCUMENTS

| | | |
|---|---|---|
| 3,738,932 A | 6/1973 | Kostenbader |
| 4,544,489 A | 10/1985 | Campbell et al. |
| 4,570,478 A | 2/1986 | Soong |
| 4,675,116 A | 6/1987 | Hoyland |
| 4,754,640 A | 7/1988 | Fitzgerald et al. |
| 4,985,149 A | 1/1991 | Ohshima et al. |
| 5,003,814 A | 4/1991 | Crawford et al. |
| 5,039,428 A | 8/1991 | Wentzler et al. |
| 5,084,186 A | 1/1992 | Gilchrist |
| 5,183,562 A | 2/1993 | Totoki et al. |
| 5,344,570 A | 9/1994 | McLachlan et al. |
| 5,382,356 A | 1/1995 | Thogho et al. |
| 5,427,691 A | 6/1995 | Kuyucak et al. |
| 5,561,520 A * | 10/1996 | Williams ............ 356/335 |
| 5,620,609 A | 4/1997 | Field |
| 5,645,799 A | 7/1997 | Shah et al. |
| 5,792,942 A * | 8/1998 | Hosokawa ............ 73/54.01 |
| 5,800,717 A | 9/1998 | Ramsay et al. |

(Continued)

FOREIGN PATENT DOCUMENTS

WO    WO 03/038350 A1    5/2003

(Continued)

OTHER PUBLICATIONS

Abu-Orf et al., "Rheology as a Tool for Polymer Dose Assessment and Control," *J. Envir. Engrg. ASCE*, 1999, 125, No. 12, pp. 1133-1141.

(Continued)

*Primary Examiner*—Peter A. Hruskoci

(57) ABSTRACT

Systems and methods for polymer addition control for sludges from water and wastewater treatment. In a treatment process where flocculating agents are used to promote solids aggregation, intrinsic physical properties of the liquid rich stream following separation may be continuously measured in order to control or optimize the amount of flocculating or treatment agent that is added to the process. These intrinsic physical properties may include, for example, the flocculating suspension or network strength. By determining the floc strength using various treating agent dosages, a optimum treating agent dose can be determined. The optimum treating agent dosage is the minimum in a floc strength to polymer dose curve.

2 Claims, 14 Drawing Sheets

U.S. PATENT DOCUMENTS

| | | | |
|---|---|---|---|
| 5,846,425 | A | 12/1998 | Whiteman |
| 5,902,487 | A | 5/1999 | Pickering et al. |
| 6,083,404 | A | 7/2000 | Sommese et al. |
| 6,110,382 | A | 8/2000 | Wiemers et al. |
| 6,143,183 | A | 11/2000 | Wardwell et al. |
| 6,210,587 | B1 | 4/2001 | Vion |
| 6,447,686 | B1 | 9/2002 | Choi et al. |
| 6,578,780 | B1 | 6/2003 | Knauer et al. |
| 6,578,781 | B1 | 6/2003 | Knauer et al. |
| 6,849,190 | B1 | 2/2005 | Abu-Orf |
| 2003/0111421 | A1 | 6/2003 | Abu-Orf |
| 2003/0230538 | A1 | 12/2003 | Abu-Orf et al. |

FOREIGN PATENT DOCUMENTS

| | | |
|---|---|---|
| WO | WO 03/051531 A1 | 6/2003 |

OTHER PUBLICATIONS

Abu-Orf et al., "Effect of Mixing on the Rheological Characteristics of Conditioned Sludge: Full-Scale Studies," *Water Sci. Techn.* (1997), 36, No. 11, pp. 51-60.

Bache et al., "Viscous Behaviour of Sludge Centrate in Response to Polymer Conditioning," *Wat. Res.*, 1999, vol. 34, No. 1, pp. 354-358.

Campbell et al., "The use of rheology for sludge characterization," *Water Sci. Technol.* (1982), 14, pp. 475-489.

Dentel, "Evaluation and role of rheological properties in sludge management," *Water Sci. Techn.*, (1997), 36(11), pp. 1-8.

Glascow et al., "An experimental study of floc strength," *J. AIChE*, (1982), 28(5), pp. 779-785.

Hannah et al., "Measurement of floc strength by particle counting," *J. AWWA*, Jan. 1967, pp. 843-858.

Higgins et al., "The effect of cations on the settling and dewatering of activated sludges: Laboratory results," *Water Environ. Res.*, 1997, 69(2), pp. 215-224.

Higgins et al., Dewatering and settling of activated sludges: The case for using cation analysis, *Water Environ. Res.*, (1997) 69(2), pp. 225-232.

Langer et al., "Mechanisms of floc formation in sludge conditioning with polymers," *Water Sci. Tech.*, 1994, 30(8), p. 129.

Michaels et al., "The plastic flow behavior of flocculated kaolin suspensions," *Ind. & Eng. Chem. Fund.*, 1962, 1(3), pp. 153-162.

Novak et al., "The effect of cationic salt addition on the settling and dewatering properties of an industrial activated sludge," *Water Environ. Res.*, 1998, 70(5), pp. 984-996.

Novak et al., "The effect of shear on the dewatering of water treatment residuals," *J. AWWA*, Nov. 1994, pp. 84-91.

Novak et al., "The effect of mixing on the performance of sludge conditioning chemical," *Water Supply*, 1990, 8, pp. 53-60.

Novak et al., "Chemical Conditioning and the Resistance of Sludges to Shear," *Journal WPCF*, Mar. 1989, vol. 61, No. 3, pp. 327-332.

Novak et al., "Chemical conditioning of activated sludge," *J. Environ. Engr.*, 1979, 105(5), pp. 993-1008.

Scott et al., "Rheology and Extrusion of Low-Grade Paper and Sludge," Apr. 1999, *TAPPI*, pp. 685-690.

Tambo et al., "Physical characteristics of flocs-II strength of floc," *Water Res.* 1979, 13, pp. 421-427.

Yeung et al., "Micromechanics: A new approach to studying the strength and breakup of flocs," *J. Colloid and Interf. Sci.*, 1996, 184, pp. 579-585.

Yen et al., "Network strength and dewaterability of flocculated sludge," *Water Res.*, (2002), 36, pp. 539-550.

Ormeci et al., "Protocol to Measure Network Strength of Sludges and Its Implications for Dewatering," *J. of Env. Engr.*, ASCE, Jan. 2005, pp. 80-85.

\* cited by examiner

METHODS FOR WATER AND WASTEWATER SLUDGE TREATMENT USING FLOC OR NETWORK STRENGTH

RELATED APPLICATIONS

This application is a divisional application, and claims the benefit under 35 U.S.C. §120, of pending U.S. patent application Ser. No. 10/461,276, entitled "Systems and Methods for Water and Wastewater Sludge Treatment Using Floc or Network Strength," filed on Jun. 13, 2003, which claims the benefit under 35 U.S.C. §119(e) to U.S. Provisional Patent Application No. 60/389,039, filed Jun. 14, 2002, each incorporated herein in their entireties.

BACKGROUND OF THE INVENTION

1. Field of the Invention

This invention relates to water treatment systems and, in particular, to systems and methods for dewatering and thickening operations within water treatment systems.

2. Description of Related Art

One of the earliest attempts to measure floc strength was described by Hannah et al. in Measurement of floc strength by particle counting, *J. AWWA*. January 1967, 843–858, wherein the change in particle size distribution during the application of a known amount of shear can be used to estimate floc strength. In Higgins and Novak, The effect of cations on the settling and dewatering of activated sludges: Laboratory results, *Water Environ. Res.*, 69 (2) (1997), 215–224 and Higgins and Novak, in Dewatering and settling of activated sludges: The case for using cation analysis, *Water Environ. Res.*, 69 (2) (1967) 225–232, used the deterioration in the dewaterability as measured by CST (capillary suction time) test results to characterize the ability of flocs to resist shear forces. Other researchers, such as Tambo and Hozumi in Physical characteristics of flocs-II. strength of floc, *Water Res.*, 13 (1979) 421–427, used the floc size and density to provide an indication of floc strength.

Glasgow and Hsu in An experimental study of floc strength, *AICHE Journal*, 28 (5) (1982) 779–785, developed a model and an apparatus for directly measuring individual floc strength from the aggregation of colloidal kaolin and either ferric chloride ($FeCl_3$) or polymer. Yeung and Pelton in Micromechanics: A new approach to studying the strength and breakup of flocs, *J. Colloid and Interface Science*, 184 (1996) 579–585, developed micromechanical techniques that pull apart single floc particles (6–40 um) and determine floc strengths. Although these techniques are of great scientific value, they are typically not applicable to sludge.

Techniques for adding a treatment agent to a sludge stream using rheology have previously been disclosed, for example U.S. Pat. No. 5,003,814 by Crawford et al. Also, Dentel in Evaluation and role of Theological properties in sludge management, *Water Sci. Technol.*, 36 (11) (1997) 1–8, offers an review of rheology and its use in sludge treatment and processing applications.

The work of Lee and co-workers (2002) deserves attention. Yen et al. in Network strength and dewaterability of flocculated sludge, *Water Res.*, 36 (2002) 539–550, tried to correlate the area of the hysteresis loop principle from the Theological data, which is obtained by first increasing and then decreasing the rotational speed of the rheometer spindle, to the network strength of sludge. The researchers realized that the area of the hysteresis loop could not represent the network strength. They calculated the total and specific energy input to the suspension, where the specific energy input was defined as the energy required to break down the sludge network. The hysteresis loop was used to determine the specific energy. Yen et al. correlated the network strength to the polymer dose, where increasing the polymer dose resulted in an increase in the network strength. Yen et al. used a concentric cylinder rheometer and offered no data concerning the reproducibility of the produced rheogram while Abu-Orf and Dentel, in Rheology as a Tool for Polymer Dose Assessment and Control, *J. Envir Engrg*, ASCE, 125, No. 12 (1999), 1133–1141, has documented that reproducibility with these measurements is a concern.

BRIEF SUMMARY OF THE INVENTION

This invention relates to systems and methods for dewatering operations within water or wastewater treatment systems.

In one or more embodiments, the present invention provides a system for adding polymer to a suspension comprising a treating agent source for supplying a treating agent dose to the suspension to create a flocculated suspension, a sensor for determining a torque of the flocculated suspension, and a controller in communication with the sensor and the treating agent source for determining a flocculated suspension strength-dose relationship based on a torque-time relationship.

In one or more embodiments, the present invention provides a method of treating sludge. The method comprises steps of adding a first treating agent dose to a sludge to create a first floc, determining a first floc strength, adding a second treating agent dose to the sludge to create a second floc, determining a second floc strength, determining a difference between the first and second floc strengths, and adjusting a third treating agent dose to the sludge based on the difference between the first and second floc strengths.

In one or more embodiments, the present invention provides a method of treating sludge. The method comprises steps of adding a first treating agent dose to create a first flocculent suspension, measuring a first torque of the first flocculent suspension, adding a second treating agent dose to create a second flocculent suspension, measuring a second torque of the second flocculent suspension, determining a difference between the first and second torque measurements, and determining a third treating agent dose based on the difference between the first and second torque measurements.

In one or more embodiments, the present invention provides a method of treating sludge comprising providing a controller in communication with a sensor capable of determining a torque of a flocculated suspension, the controller capable of determining a flocculated suspension strength-dose relationship based on a torque-time relationship of the flocculated suspension.

Other advantages, novel features, and objects of the invention will become apparent from the following detailed description of the invention when considered in conjunction with the accompanying drawings, which are schematic and which are not intended to be drawn to scale. In the figures, each identical, or substantially similar component that is illustrated in various figures is represented by a single numeral or notation. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

Non-limiting embodiments of the present invention will be described by way of example with reference to the accompanying drawings in which.

DETAILED DESCRIPTION OF THE INVENTION

Figure 1:
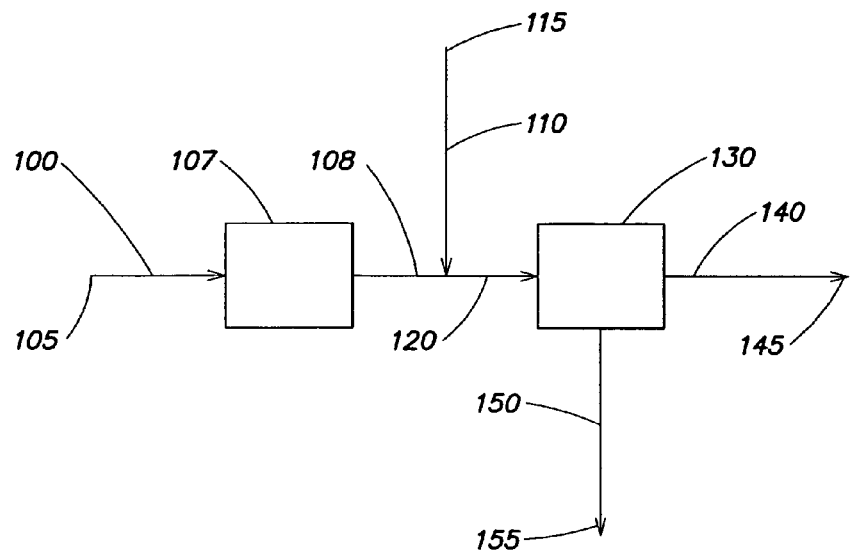
FIG. 1 is a schematic diagram of a wastewater treatment system in accordance with one or more embodiments of the invention.

During the treatment of water or wastewater, a residuals stream arising from, for example, a water treatment plant, a wastewater facility or an industrial process, would be dewatered or thickened to reduce the volume of liquid waste, or to produce a more solid-like waste for disposal or reuse. This residuals stream is typically termed "sludge" and in some cases "biosolids." The sludge stream may be separated into a liquid-rich stream and a solid-rich "cake" stream. The cake stream may be converted into fertilizer, or otherwise disposed of. The liquid-rich stream may also be referred to as a "centrate" or a "filtrate," depending on the separation technique used, in reference to centrifuges and filters, respectively. In some cases, a treatment agent may be added, for example, to promote aggregation of solid material for easier handling, separation, or disposal. The process of adding such agents is termed conditioning. The optimal amount of treatment agent or agents may be a function of the solids content or other inherent property of the sludge stream. Floc strength can be used to characterize sludges.

For the purpose of sludge characterization, it is appropriate to determine the overall strength of sludge suspension rather than determine the strength of individual sludge flocs because individual floc strengths may vary greatly, especially during conditioning, and therefore the overall suspension strength should be a more meaningful measurement. In this invention we refer to unconditioned or conditioned sludge suspension as "network", and a protocol to measure the overall sludge network strength using rheology techniques. The model of flocculation of kaolin suspensions offered by Michaels and Bolger (The plastic flow behavior of flocculated kaolin suspensions. *Ind. & Eng. Chem. Fundamentals*, 1 (3), (1962), 153–162) in which the floc and not the single particle is considered as the basic unit of flow under shear. The flocs tend to cluster together forming weak aggregates, which in turn grow by collision and break down by shear, and form extended networks that give the suspension its structural properties.

A concentric cylinder rheometer can be used to measure the network strength. Abu-Orf and Dentel (1999) reported that multiple shear stress-shear rate rheograms measured using the same sample exhibited a wide difference with both wastewater and synthetic sludges especially in well-flocculated samples. This, it is believed, is mainly due to the small volume of the reservoir of the spindle, and the impossibility of obtaining identical samples for measurements containing the same amount of flocculated solids and water. Torque rheometers, on the other hand, can employ much larger sample volumes, and accordingly could deliver better reproducibility.

Accordingly, this invention uses rheology techniques to determine the ability of a suspension to withstand shear forces, which, it is believed, is a function of the chemical and physical bonds that hold the suspension network together. The methods of the present invention can be used to measure the sludge network strength. Rheology describes the deformation (e.g., strain) of a body under the influence of stresses, and can be used to understand or characterize the nature and/or structure of flocculated suspensions.

This invention uses rheology to arrive at a standard protocol to measure, in some cases, directly, the sludge network strength in terms of energy dissipated for a given volume of sludge. The protocol can also be used for other suspensions. At least two protocols can be used in the present invention depending on the analytical rheometer used (described in detail below). What is relevant is the ability to correlate the calculated network strength from rheological measuring techniques to the sludge conditioning and dewaterability. Typically, the suspension's strength increases with increasing polymer dose; however, at the optimum, or near the optimum, polymer dose this strength can be slightly lower, which can allow the network to release some of the incorporated water while maintaining the network structural integrity. This should lead to good suspension dewaterability at the optimum conditioning dose without complete network deterioration.

In a water treatment process where flocculating agents are used to promote solids aggregation, intrinsic physical properties of the liquid rich stream may be continuously measured in order to control or optimize the amount of flocculating or treatment agent that is added to the process. These intrinsic physical properties may include, for example, the viscosity or the density. By continuously measuring an intrinsic physical property of the liquid rich stream, additional tracing compounds may not need to be added to the water treatment system. The treatment process may also include a holding tank, or a device that separates the entering water into two or more streams, such as a liquid-rich stream and a solid-rich stream.

The present invention may be used in any process where the treatment of wastewater is desired, for example, as in a water treatment plant, a wastewater facility or an industrial process. As used herein, "wastewater" refers to any residuals stream that may contain solid or biosolid material, such as from a sewage treatment operation. Any volumetric flow rate may enter the wastewater treatment system, for example, an average flow rate of about 1000 gal/min, about 500 gal/min, or about 100 gal/min. The flow rate of fluid into the treatment system may be steady, periodic, or irregular, depending on the application. Other flow rates may be necessary in certain cases. In some cases, the fluid may first be collected into a holding vessel to, for example, control or regulate the flow of fluid through the treatment system, or dampen irregularities in the flow rate. Any holding vessel suitable for containing or storing the fluid may be used. As used herein, a "fluid" generally refers to a substance having flow properties, including slurries, semi-solid systems, or liquids containing solid or suspended components.

Thus, in one or more embodiments in accordance with the present invention, the torque at certain times of applying the shear has the same relationship with the polymer dose, where the torque again at a specific time increases with increasing the polymer dose; however, at the optimum, or near the optimum, polymer dose this measured torque will be slightly lower and can provide an indication at the optimum dose.

In another embodiment, the present invention provides a system for adding polymer to a suspension comprising a treating agent source supplying a treating agent dose to the suspension to create a flocculated suspension, a sensor disposed to determine a torque-time relationship or a shear stress-shear rate relationship of the flocculated suspension, a controller in communication with the sensor and the treating agent source programmed to determine a flocculated suspension strength-dose relationship, based on the torque-time relationship, and a minimum in the flocculated suspension strength-dose relationship with respect to the treating agent dose, and adjust the treating agent dose to maintain the minimum. The sensor can also be used to characterize a shear stress-shear rate relationship of the flocculated suspension. The strength-dose relationship can also be based on the shear stress-shear rate relationship.

In one or more embodiments, the present invention provides a system for adding polymer to a suspension comprising a treating agent source for supplying a treating agent dose to the suspension to create a flocculated suspension, a sensor for determining a torque of the flocculated suspension, and a controller in communication with the sensor and the treating agent source for determining a flocculated suspension strength-dose relationship based on a torque-time relationship.

Yet, in another embodiment, the present invention provides a method of treating sludge. The method comprises the steps of adding a first treating agent dose to a sludge to create a first floc and determining a first floc strength. The method further comprises the steps of adding a second treating agent dose to the sludge to create a second floc, determining a second floc strength, determining a difference between the first and second floc strengths and adjusting a third treating agent dose to the sludge based on the difference between the first and second floc strengths.

In one or more embodiments, the present invention provides a method for optimizing dewatering operations. The method comprises matching the flocculated suspension strength with the shear values that these flocculated suspension will experience within a dewatering device. The shear within a dewatering device may be adjusted by adjusting operational parameters of the dewatering device. The floc- culated suspension strength may be adjusted by changing the treating agent dose, adjusting the mixing conditions of the treating agent with the suspension, or by changing to a different treating agent. The flocculated suspension's strength may be measured by rotational rheometer such as torque rheometer or concentric cylinder rheometer or any kind of rheometer.

The treatment agent added to the residuals stream may be any treatment agent. For example, the treatment agent may be a flocculating agent, a pH buffer, a fluid having a different temperature to control the temperature of the residuals stream, a disinfectant, a detoxification agent, a chelating agent, a chlorination agent, a bromination agent, an oxidant or a reductant, or the like. In some cases, the addition of treatment agent to the residuals stream may improve its handling characteristics, for example, by allowing or facilitating the separation of solid material out of the residuals stream, or by altering the temperature or the density of the residual stream.

Flocculating agents may be used in some embodiments of the invention to cause the aggregation of certain materials within the residuals stream into solid aggregates. The aggregates may then be removed in any separation process, for example, in a centrifugation or a filtration process. Any flocculating agent may be used in this invention, such as, but not limited to, polyaminoalkylmethacrylates, polyaminoalkylmethacrylates and their copolymers, polyacrylester-acrylamide copolymers, polyamines, polyethyleneimines, dicyandiamines, chitosans, polyacrylamides, polyethylene oxides, sodium polyacrylates, acrylamide-sodium acrylate copolymers, or carboxylmethyl celluloses. An example of a suitable flocculating agent is PERCOL® 757 polyacrylamide, available from Ciba® Specialty Chemicals, Inc. (Basel, Switzerland).

FIG. 1 shows a typical treatment process wherein one or more embodiments of the invention can be utilized. Residuals stream 100 arising from point of entry 105 is typically collected in holding tank 107. Treatment agent from treatment agent stream 110 arising from point of entry 115 is typically added to residuals stream 108 from tank 107, producing stream 120. The treatment agent may, for example, promote the aggregation or flocculation of any material within the stream. Stream 120 enters separation device 130, which separates the aggregates into a solid-rich biosolid stream 150 and a liquid-rich stream 140. Stream 150, exiting though outlet 155, may be, for example, converted into material suitable for fertilizer applications, would typically be sent downstream for further processing, or otherwise disposed. Stream 140, exiting through outlet 145, may be, for example, further processed, purified or recycled for further treatment. For example, any residual solid materials contained in stream 140 may be further concentrated and separated to produce a liquid stream essentially free of any solids.

Figure 2:
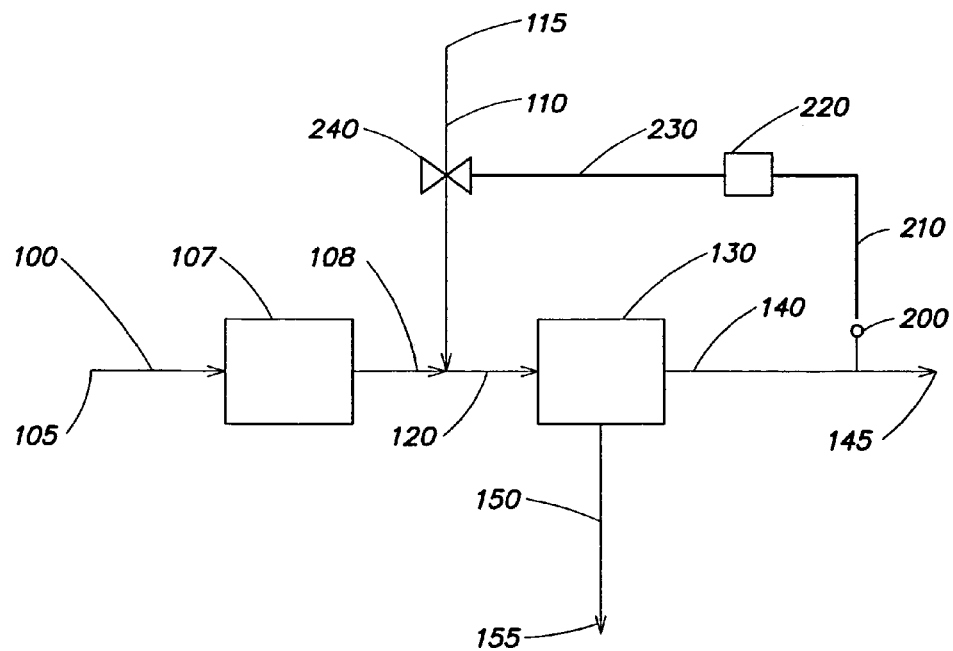
FIG. 2 is a schematic diagram of one or more embodiments of the invention, showing a sensor connected to a liquid-rich stream.

Another embodiment is illustrated in FIG. 2. Fluid in residuals stream 100 from point of entry 105 typically collected in holding tank 107. Fluid from residuals stream 108 arising from holding tank 107 mixes with treatment agent from treatment agent stream 110. The two fluids mix in stream 120. Stream 120 then enters separation device 130. Separation device 130 separates the entering fluids into a liquid-rich stream 140 and a solid-rich biosolid stream 150. Sensor 200, fluidly connected to liquid-rich stream 140, produces a response based on a measured physical property, such as, for example, viscosity or other rheological property, of liquid-rich stream 140. Based on the measured physical property of the stream, sensor 200 produces a signal, which is transmitted through signal line 210 to controller 220. Controller 220, using, for example, a preprogrammed algorithm, determines an appropriate response for device 240 to control the entering flow of treatment agent. Based on this determination, controller 220 transmits a signal through signal line 230 to device 240. Flow control device 240, responding to the signal from controller 220, controls or regulates the flow of treatment agent entering point of entry 115 into treatment agent stream 110.

Figure 3:
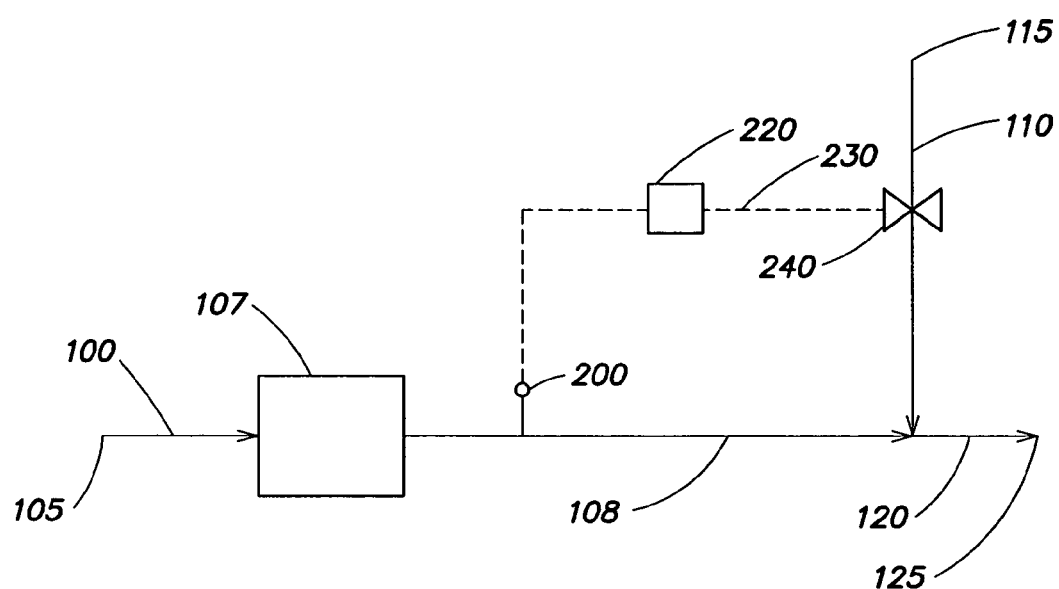
FIG. 3 is a schematic diagram of one embodiment of the invention, showing a sensor connected to a solid-rich stream.

FIG. 2 illustrates how one embodiment of this invention may be used to measure a physical property of liquid-rich stream 140 and control the addition of treatment agent in a feedback-based control arrangement. It should be understood that the components of the invention may be rearranged as desired without departing from the scope of the invention. For example, sensor 200 can be positioned on solid-rich stream 150, as is shown in FIG. 3, or positioned on stream 120. Other configurations of the invention are also possible. In certain cases, the components may be arranged in, for example, a feedforward control system.

Sensor 200 may be any sensor that can continuously measure a physical property of a stream, such as a rheological property. As used herein, "continuous" refers to processes where the sensor makes measurements instantaneously, rapidly or repeatedly. Of course, a certain amount of time lag may exist in the sensor, for example, in sensor systems where a brief integration time is needed, or in sensors where the computation of a parameter occurs. For example, the sensor may characterize a rheological property by generating a rheogram with an associated time duration during the generation of the rheogram curve as well as with the duration associated with integrating the area defined by the rheogram curve. As used herein, "rheological properties" refers to the intrinsic measurable physical properties of the fluid or solid streams during flow, including, but not limited to, viscosity and density. As sensor 200 is able to continuously measure an intrinsic physical property of the stream, tracer compounds, which can be expensive, environmentally undesirable, or require additional processing steps for removal, may not need to be added to the treatment system.

In other embodiments, the sensor may be a viscometer. The viscometer may be any viscometer that can continuously define the rheology of a non-Newtonian fluid, such as a rotational-based viscometer such as torque or concentric cylinder rheometers. The viscosity of the fluid may change with the amount of treatment agent in the liquid. In some embodiments, the viscosity may be used to indicate the optimal dosage of treatment agent. In certain embodiments of the invention, deposits from the process streams, such as, for example, centrate foam, may form on the viscometer. Thus, cleaning mechanisms may be installed on the viscometer to prevent the buildup of deposits. Cleaning may be required, for example, daily or hourly. In other embodiments, the viscometer may not be affected by centrate or filtrate deposits, and thus, no automatic cleaning mechanism may be required.

Signal lines 210 and 230 may be any signal line that can transmit a signal from sensor 200 to controller 220, or controller 220 to device 240, respectively. The signal may be any suitable signal, for example, a pneumatic signal, an electrical signal, a mechanical signal, or the like. In some embodiments of the invention, electrical signals may be particularly suitable. Signal lines 210 and 230 do not necessarily have to transmit the same type signal. For example, signal 210 may be a pneumatic signal and signal 230 may be an electrical signal. In other cases, signals can be wirelessly transmitted by, for example, electromagnetic carrier such as, but not limited to radio or light.

Controller 220 may be any system or mechanism that can detect and/or receive the incoming signal from signal line 210, determine and/or generate an appropriate response for device 240, and transmit a signal through signal line 230 to device 240, directing device 240 to give the appropriate response. Controller 220 may be, for example, a mechanical controller, a pneumatic controller, a computer, a semiconductor chip, or the like. Controller 220 may be incorporated into a feedback or a feedforward control loop. In some embodiments, the controller may comprise an algorithm that can arrange the characteristics of one or more streams in a treatment system to process and/or determine an optimal flowrate of treatment agent into residuals stream 108. The algorithm may be any algorithm suitable for determining an appropriate response for device 240 and can include routines or techniques such as Minimum Search Routines, fuzzy logic techniques, or any algorithms that can determine an optimum based on historical data or trends thereof. Controller 220 may be a "hard-wired" system, or the controller may be programmable and adaptable as needed. The algorithm may be a predetermined algorithm or it may be an algorithm that may adapt with changing process conditions, such as in a process where the flow is pulsatile or randomly distributed.

Device 240 may be any device that can regulate the flow of treatment agent through treatment agent point of entry 115 into treatment agent stream 110. For example, device 240 may be a valve or a pump. In one embodiment, as an example, the throughput rate of a pump that can be a part of device 240 may be altered in response to a signal from controller 220. In another embodiment, the pump may be activated or deactivated in response to a signal from controller 220. In still other embodiments, a valve can be part of device 240 and can be used to regulate the flow of treatment agent. For example, the valve may be a plug cock valve, a gate valve, a diaphragm valve, a globe valve, a butterfly valve, or the like and, in response to signals from controller 220, the valve may respond by fully opening and closing in some embodiments, or by partially opening and closing. Other methods for regulating the flow of treatment agent into treatment agent stream 110 may also be envisioned. For example, a concentration of treatment agent in stream 120 may be controlled by the appropriate addition of a diluent to the treatment agent stream.

It is to be understood that a variety of configurations may be used in the present invention. For example, multiple sensors or controllers may be used to control the flow of treatment agent into the system. Signals from outside of the system may also be used to control or direct addition of treatment agent. For example, a process located upstream of point of entry 105 may transmit an appropriate signal to controller 220. Controller 220 may then utilize this information to determine an appropriate response for device 240. Thus, the treatment systems, as described herein, may be modified as desired for a particular process. In some cases, systems of the invention may include additional components than those illustrated; and, in some cases, systems of the invention may not include all of the illustrated components.

In accordance with one or more embodiments of the present invention, the treatment system may include a device capable of separating the residuals stream into two or more streams, such as a liquid-rich stream and a solid-rich biosolid stream. For example, the separation device may be a vacuum filter, a filter press, a centrifugal separator, a belt press-type filter, a screw press, or the like. The separation device may treat the entering fluid to produce a liquid-rich stream, which may contain, for example, less than about 0.5% solids, or, in some cases, less than about 0.1% solids. The liquid-rich stream may also be further processed in downstream unit operations. For example, the liquid-rich stream may be further purified, recycled for further treatment, discharged to the environment, or otherwise disposed of. The liquid-rich stream is also referred to as a "centrate" or a "filtrate," in reference to centrifuges and filters, respectively; these terms can be used interchangeably.

The materials in the biosolid stream may undergo further processing, be discharged, or otherwise disposed. For example, the biosolids may ultimately be converted into fertilizer, or stored for disposal in a landfill. The biosolid stream may also contain residual amounts of liquid. The dewatered or thickened stream may contain any concentration of solids. For example, the dewatered or thickened stream may contain greater than about 5% solids, greater than about 15% solids, or between about 18 and about 25% solids. In certain embodiments, the stream may contain between about 5% to about 7% solids, between about 40% and about 50% solids, or between about 20% and about 60% solids. Other solid concentrations are also possible.

It should be understood that alternative configurations of the invention may exist. For example, additional residuals or treatment streams may also enter into the system, or mixing of the residuals stream and the treatment agent stream may occur within separation device. The separation device may also produce additional streams other than the streams described above, or other unit operations may be located within the treatment system.

According to some embodiments, the present invention provides a system and method for measuring the floc strength of a wastewater treatment process or product. In some cases, the present invention can correlate a measured strength of a flocculated suspension, such as sludge, residuals and others, to an optimum treatment agent dose. In some cases, an optimized amount of a treatment agent can be added prior to dewatering. In some embodiments, the measured torque, as by, for example, a rheometer, at different times and at varied treatment agent or polymer dosages, can be used to determine an optimum polymer dosage for conditioning.

Further, by, for example, using an appropriate algorithm, such as a minimum search algorithm, on-line monitoring and automatic control of optimum polymer dose can be performed in a continuous or semi continuous manner. To obtain a baseline, for example, a first dose of polymer can be charged to, typically, a part of the suspension to create a first floc or flocculated suspension or network and the torque thereof measured to obtain or define a first torque-time curve. A second charge, typically different from the first charge, can be charged to a second, separate part or sample of the suspension to form a second floc or flocculated suspension or network and the torque thereof measured to obtain or define a second torque-time curve. The areas defined by each torque-time curve can be determined, such as by integration, to generate and/or be correlated to respective floc strengths, and compared. In accordance with one or more embodiments of the present invention, if the second floc strength is greater than the first floc strength, then additional polymer can be added. If the second floc strength is determined to be less than the first, then the optimum polymer dosage may have been achieved.

Continued searching of the optimum polymer dose, as by using an appropriate algorithm, for example, a minima searching algorithm, can define the optimum, or near optimum, polymer dose. For example, the floc strength of various polymer dosages can be measured. The optimum, or near optimum, can be approximated as a point wherein a next measurement is less than a previous measurement. Notably, the searching principles can be automated by the use of minimum searching algorithms that would be incorporated in the controller of the present invention.

The methods according to some embodiments can depend on the type of rheometer used. The conditioned sludge suspension can be referred to as "network" and thus, the network strength can be measured. The term network typically describes flocculated sludges because it represents a network of sludge flocs or flocculated suspension. The "absolute" network strength is typically not measured, rather the comparative strength of different networks is typically measured using the same instrument and under similar conditions.

Rotational rheometers typically measure rheological properties of non-Newtonian suspensions. The measurements can be conducted by increasing the shear rate from zero to a certain value in a set amount of time. Rotational rheometers typically measure the shear stress of the network at different shear rates. The measured/reported values already take into consideration the correction factors for the sensors used so the results should be independent of the sensor type. Typically, the shear rate is applied to the sludge from 0–100 in 90 seconds.

Examples of rheometers that can be used according to the present invention, include FLOCCKY rheometer, available from Koei Industry Co., Ltd., Japan and those from Thermal Haake (Germany).

According to some embodiments, the area under the shear stress, as a function of shear rate, can be used to estimate or represent the network relative strength. The relationship, it is believed, is based on viscosity and energy dissipation principles.

Newton's law of viscosity states that shear stress is equal to $F/A=\mu \, (dv/dy)$ where F is force, A is area, $\mu$ is viscosity, and $dv/dy$ is the velocity gradient. By multiplying both sides of the equation with $dv/dy$, the following equation results:

$$(F/A)(dv/dy)=\mu \, (dv/dy)^2 \quad (1)$$

Rewriting the velocity v as $dx/dt$, the left side of equation (1) becomes $d[Fdx/Ady]/dt$. Since Fdx typically equals an increment of energy dE, and Ady typically equals an increment of volume dV, the quantity dE/dV should give the energy dissipation per unit volume. Dividing dE/dV by dt should give the rate of energy dissipation per unit volume.

$$(dE/dV)/dt=\mu \, (dv/dy)^2 \quad (2)$$

In a rheogram where shear stress is plotted against shear rate, the area under the curve can be found by multiplying shear stress with the shear rate. Therefore, the area under the rheogram should be:

$$\text{Area} = \int \left(\frac{F}{A}\right) d\left(\frac{dv}{dy}\right) \quad (3)$$

From Equations (1) and (3), the area under the curve equals $\mu \, (dv/dy)^2$, which, it is believed, equals the rate of energy dissipation per unit volume as stated in equation (2).

The energy dissipated in the flocculated sludge or network can be related to the network strength. Three forms of energy dissipation can be pertinent during flocculation while applying shear forces: the network energy, the aggregate or creep energy, and the viscous energy. Under shear forces, the network bonds within a suspension can be stretched and deformed. When shear exceeds the yield stress of any network link, it is believed that the link will break and the broken link will snap back to its unstrained position. This can lead to local viscous oscillation where energy is dissipated in a fashion similar to a spring, which has been stretched by a cord that is broken. This energy can be termed network energy. The aggregate or creep energy typically dissipates under further shear where more energy would be used to break down aggregate structure by breaking the bonds between the flocs. Finally, viscous energy typically dissipates by fluid flowing around the flocs where viscous energy loses occur due to the presence of particles. Thus, the total energy dissipation into the suspension can represent the network strength.

The total rate of energy dissipation per unit volume can be converted to total energy dissipation per unit volume in the network for a given duration, time, required to reach a specific shear rate. This can be accomplished by multiplying the area under the shear stress vs. shear rate rheogram with the required time to reach the specific shear rate. This equals the total energy dissipation per unit volume in the network.

The area under the rheogram up to a shear rate of 25 sec$^{-1}$ equals A. If the time to reach shear rate of 25 sec$^{-1}$ is t (seconds), then the total energy dissipation ($E_{td}$) in the network per unit volume equals $E_{td}$=A t. If the solids content of the sample is X (kg/m$^3$), then $$E_{td} = \frac{At}{X}, \tag{4}$$

where $E_{td}$ is total energy dissipation per dry solids (DS) (Joule/kg DS) and represents network strength; A is area under the rheogram up to a certain shear rate (kg/sec$^3$ or Pa/sec); t is the time to reach that certain shear rate (sec); and X represents solids content of the sample (kg/m$^3$).

When comparing two network structures, at a given shear rate on the rheogram, if the area under the rheogram of network A is greater than the area of network B, then the energy dissipated in network A is typically greater than the energy dissipated in network B. This means that A has a stronger network structure than B. Thus, the area under the shear stress vs. shear rate rheogram can be a measure of relative network strength.

According to some embodiments of the present invention, the area under the torque-time graph (rheogram) can be used for estimating the network relative strength.

Torque rheometers most commonly apply a constant shear in terms of rotational speed to the sample and measure the resistance of sample to shear applied in units of torque (Nm). The torque values are typically recorded as a function of the testing time and a plot of the test results is called a rheogram. Torque rheometers have been widely used for decades in plastic and rubber industry to compare different samples with respect to each other or with respect to a standard. Since torque rheometers typically utilize larger sample volumes and various shapes of rotors, flow patterns and correlation factors are different than those of the traditional rotational rheometers, and thus certain assumptions may not apply. As a result, direct conversion of torque values to shear stress and shear rate may not be very accurate and is not suggested by rheometer manufacturers.

The torque values can provide an indication of the relative values for the viscosity of the suspension. Both peak and tail of the rheograms are of interest, however rheologists who use these torque-time relationships are more focused on the curve shape after the peak since it represents the homogeneity and stability of the material. Similar to rotational rheometers, the output of these torque rheometers is dependent upon the instrument and operational or process parameters. The area under the torque time relationship can also be used to express network strength as described in the following discussion.

In general, $$\gamma(\text{mean shear rate})=C_1 N \tag{5}$$

$$\tau(\text{mean shear stress})=C_2 M \tag{6}$$

where $C_1$ and $C_2$ are constants depending on the geometry of the mixer rotor and cup; N is the number of revolutions per minute (rpm); and M is torque.

Since $E_{tot}=\gamma\tau$, then $$E_{tot}\approx\text{constant N M}. \tag{7}$$

Figure 4:
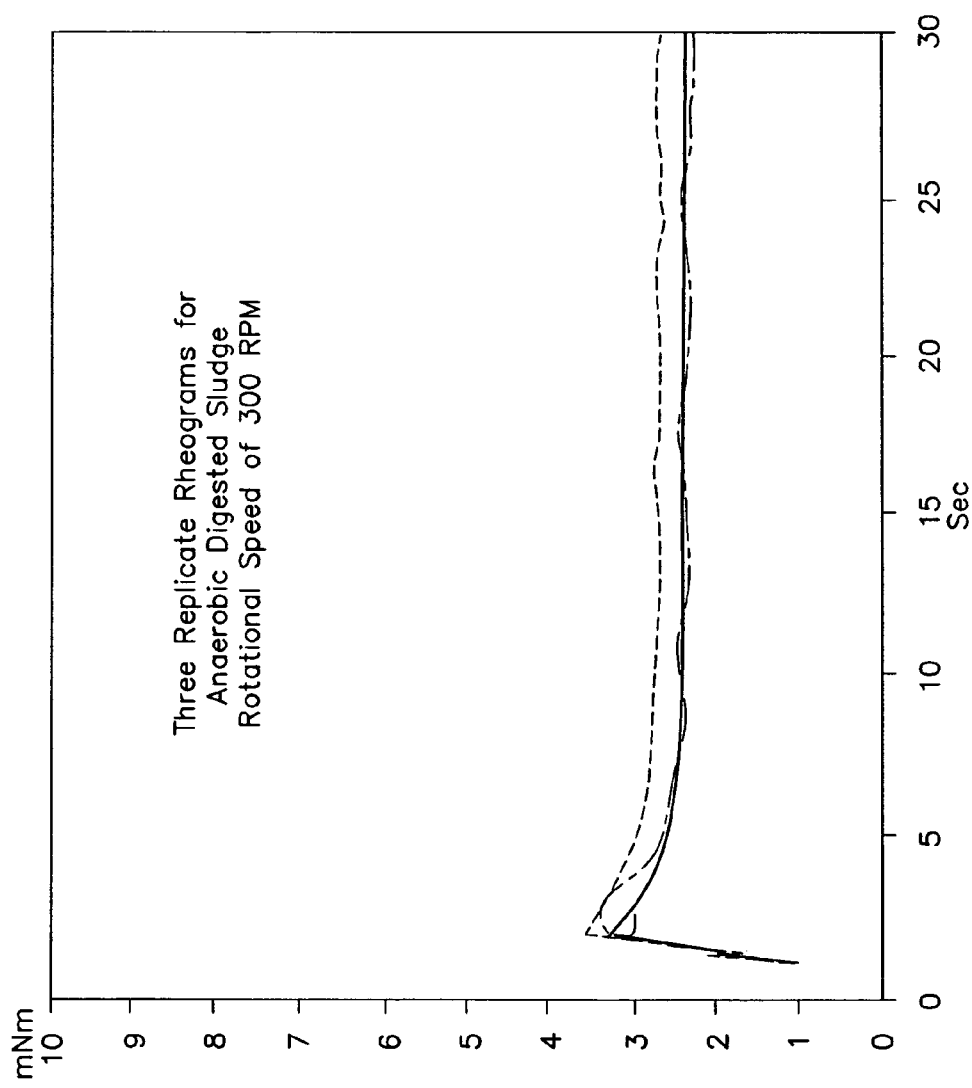
FIG. 4 is a graph showing measured torque as a function of time in accordance with one or more embodiments of the invention.
Figure 5:
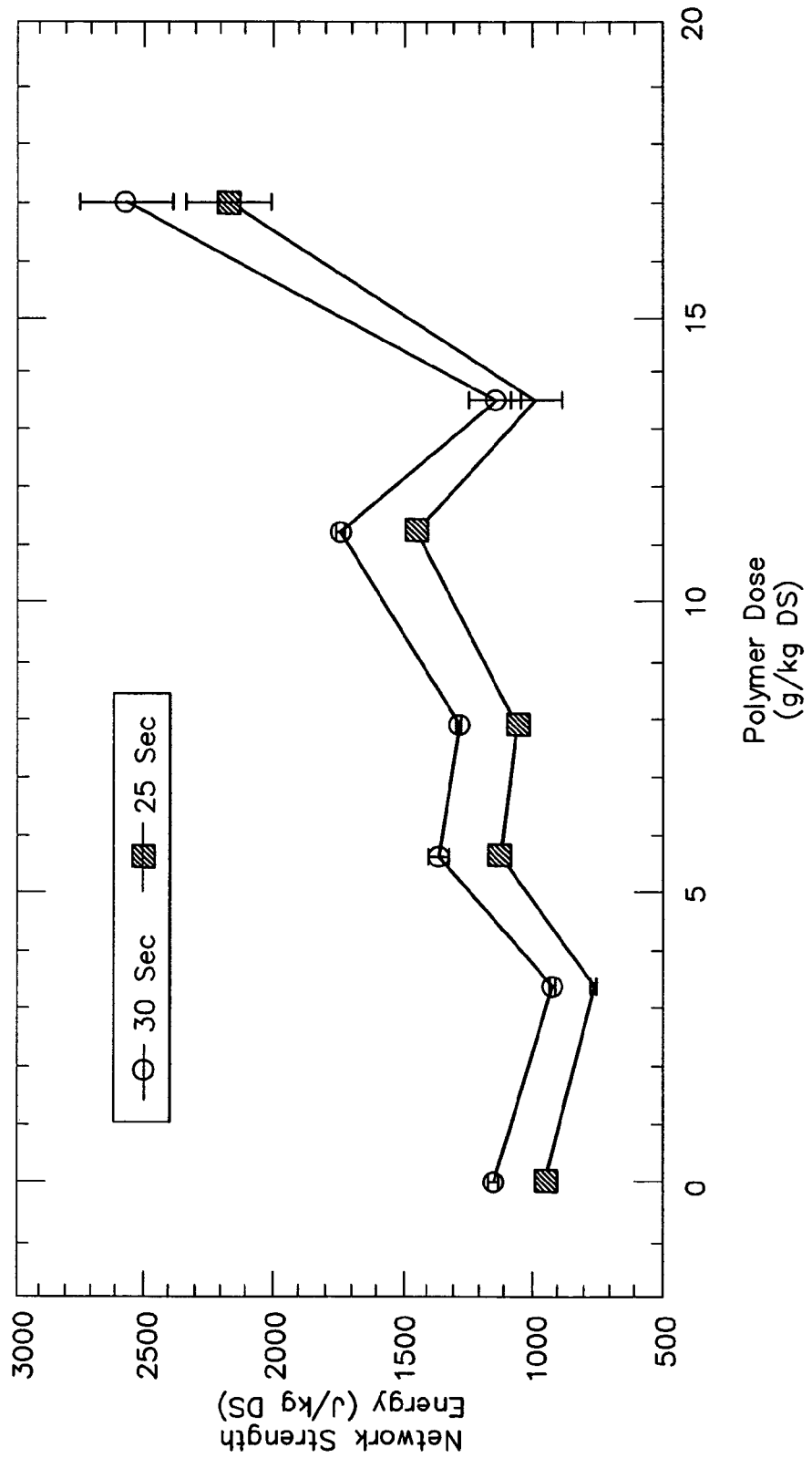
FIG. 5 is a graph showing network or floc strength, calculated according to equation (11), as a function of polymer dose (DS, dry solids) as discussed in the example.

Thus, the measured torque multiplied by the rotational speed, which is also the area under the torque time rheogram, can represent the total energy dissipation rate in a suspension. FIG. 4 also shows a typical rheogram of torque-time relationship. The area under the torque-time curve at a given time is the "totalized torque" (TTQ), which represents the energy that goes into the system for that given time. Totalized torque values provide information for comparison purposes between different samples. For example, torque rheograms of two samples may exhibit very different shapes but stabilize at the same torque value at the end of the test. If we only compare the final torque values, the samples may be thought of to be identical. However, comparison of totalized torque values will reveal the differences in the network strength of the samples.

The area under the torque-time rheogram can be used to estimate the relative network strength after converting totalized torque (TTQ) to work energy.

An impeller, having a radius, r, travels a distance equal to $2\pi rN$, where N is the revolutions per minute. The work energy (W) equals force (F) multiplied by the distance covered by the impeller. Thus, W=$2\pi rNF$. Since torque (M)=F r. The total work energy is:

$$(W_t) = 2\pi rN \int_{t_1}^{t_2} (M(t)/r)\,dt \tag{8}$$

$$W_t = 2\pi N \times TTQ. \tag{9}$$

The unit work energy will be:

$$W_u = [2\pi N \times TTQ]/V_b, \tag{10}$$

where $W_u$ is unit work energy (Joule/cm$^3$); N is rotational speed (rpm); TTQ is totalized torque or area under the rheogram (Joule-min); and $V_b$ is the processed volume (cm$^3$).

When using a rheometer as a FLOCCKY instrument, which reports the TTQ (area under the torque time relationship) in mJ-sec, and uses a 200 mL sample size, equation 10 becomes:

$$W_u = 0.524\,N(TTQ)/X, \tag{11}$$

where, $W_u$=work energy in Joule/kg DS; N is in rpm; TTQ is in mJoule-sec; and X is solids concentration of sludge sample in g/L.

The unit work ($W_u$) is defined as the work energy required for processing a unit volume. As previously discussed, the energy required to process a given mass or volume of a material is representative of the energy dissipated into the suspension which indicates the network strength of the suspension.

It is important to point out that the above two methods are not for measuring the "absolute" network strength, but to measure the network strength of samples "relative" to each other using the same instrument and measurement conditions. Moreover, the reported network strengths in this invention are cumulative over time.

The desired or required dewaterability from a dewatering device is the overall output of the process. The factors that affect the desired dewaterability are almost always specific to the dewatering device's ability to squeeze or withdraw water from the sludge without applying too much energy to cause floc deterioration. Current practices utilize adjustments to the device's operation on a semi continuous, after-the-fact basis through operator intervention. The factors that influence the properties of the flocculated sludge that are going to be subjected to dewatering forces, (e.g., how the sludge are flocculated in the first place), are not usually optimized for the dewatering process, but the thickening process. Plant operators should be able to design the suspension's strength to match the shear strength that the suspension's flocs will be subjected to during the dewatering process in order to achieve the desired dewaterability. The use of rheology to measure the suspensions' strength offers an appropriate tool.

The factors that affect rheology measurements should be initially understood and, once understood, used in a proactive manner. These factors include: the suitability of the rheology device, the rate of applying the shear for rheology measurements, the conditioner type, the mixing conditions during conditioning, the inherent properties of the sludge (e.g., cations content, biopolymer content, total solids, etc.) as well as other properties.

The art described in this invention offers a protocol for measuring comparative sludge network strength as indicated by the total energy dissipated in the sludge system during applying shear forces in Theological measurements. One advance is the fact that the energy within the network correlated well with the filtration and to some extent the capillary suction time (CST) results for indicating the optimum, or near optimum, dose in laboratory experiments. The optimum dose is indicated by a "drop" in the energy with increasing the polymer dose at the optimum level. The decrease observed in the energy of the network at the optimum dose can be explained as follows. Water associated with sludge flocs can be categorized in three different groups free water, interstitial water, and bound water. Free water is not bound to the particles, interstitial water is bound by capillary forces between flocs, and bound water is tightly held to the surfaces. Consequently, the intensity of the binding energies of these waters is different, highest for the bound water and lowest for the free water. The binding energy for free water is less than 0.28 kJ/kg water, and for bound water is higher than 5 kJ/kg water. When the optimum polymer dose is reached during conditioning, some of the water incorporated in sludge flocs (mostly interstitial water) is converted into free water. Since free water has a lower energy than other types of water, the overall network energy will also be lower at the optimum dose. Thus, an optimum dose or near optimum dose can be determined by monitoring the energy of the system.

Another physical explanation for this correlation is that flocs within the network exhibited lower resistance, which allowed them to release most of their water by filtration, for example, while maintaining their structure integrity and withstanding the shear. This is an important factor for dewaterability since the dilemma in designing conditioned sludges has been that it is desirable to have strong flocs during dewatering, yet sludges need to yield water. Thus, the art in this invention offers an innovative concept and a technology to overcome this dilemma. Ultimately, treatment plant operators would use the technology prior to sludge dewatering to continuously measure sludge network strength, and adjust the upstream wastewater chemical character (cations for example), mixing conditions, and polymer dose to control strength for better dewaterability.

The function and advantages of these and other embodiments of the present invention will be more fully understood from the following examples. These examples are intended to be illustrative in nature and are not considered to be limiting the scope of the invention.

EXAMPLE

This example illustrates one embodiment of the invention directed to optimizing the treatment agent dose in a wastewater treatment system.

Sludge from the North Durham Water Reclamation Facility (Durham, N.C.) was used. A FLOCCKY rheometer instrument was used for full scale, on-line monitoring of suspensions. The treating agent, polymer, used was a solution of 0.5% 655 K polymer, available from Stockhausen, Inc., Greensboro, N.C.

Figure 6:
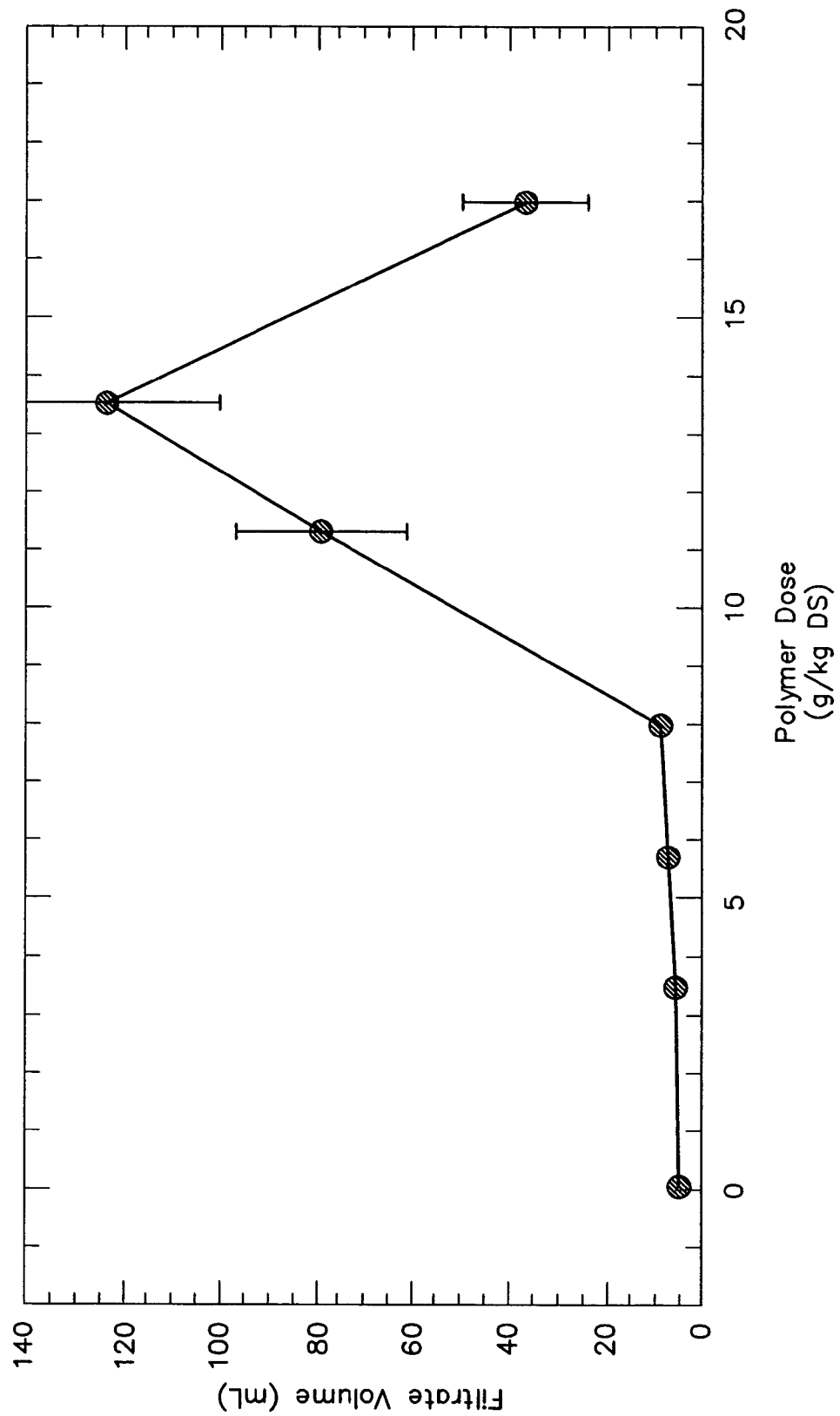
FIG. 6 is a graph showing filtrate volume following filtration of the sample discussed in the example.
Figure 7:
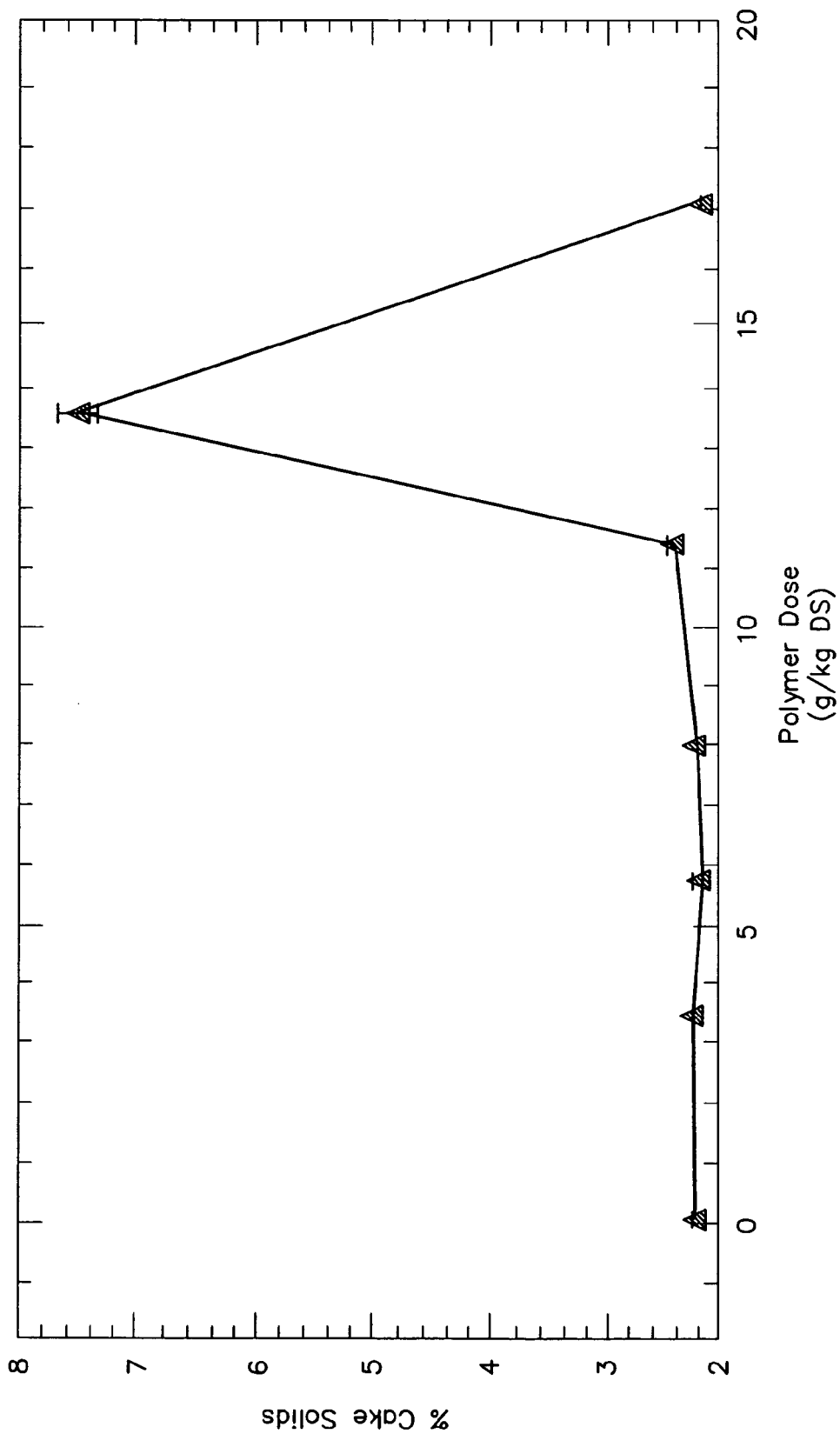
FIG. 7 is a graph showing the amount of cake solids following filtration of the sample shown in FIGS. 5 and 6.

As shown in FIGS. 5–8A, 9A–9D, and 10A–10B, the optimum agent dose for sludge dewatering can be defined where the filtrate volume and the cake solids are highest. As exemplarily shown in the figures, the dosage is about 13.5 g/kg of sludge. As shown, increasing the polymer dose can lead to measured torque, for different times. At this optimum dose, a lower torque can be observed. The suspension strength, as indicated by the torque can be used to indicate polymer optimum dose. Further by using an appropriate algorithm, such as a minimum search algorithm, on-line monitoring and automatic control of optimum, or near optimum, polymer dose can be achieved. In particular, FIGS. 6 and 7 show that the optimum, or near optimum, polymer dose for this suspension is at about 13.5 g/kg sludge because it maximizes the amount of cake solids and filtrate volume. Monitoring the floc strength as a function of polymer dose, a minima or inflection point is observed, which corresponds to the optimum polymer dose. Accordingly, by monitoring the floc strength for various polymer dosages, the optimum polymer dose was found.

Figure 8:
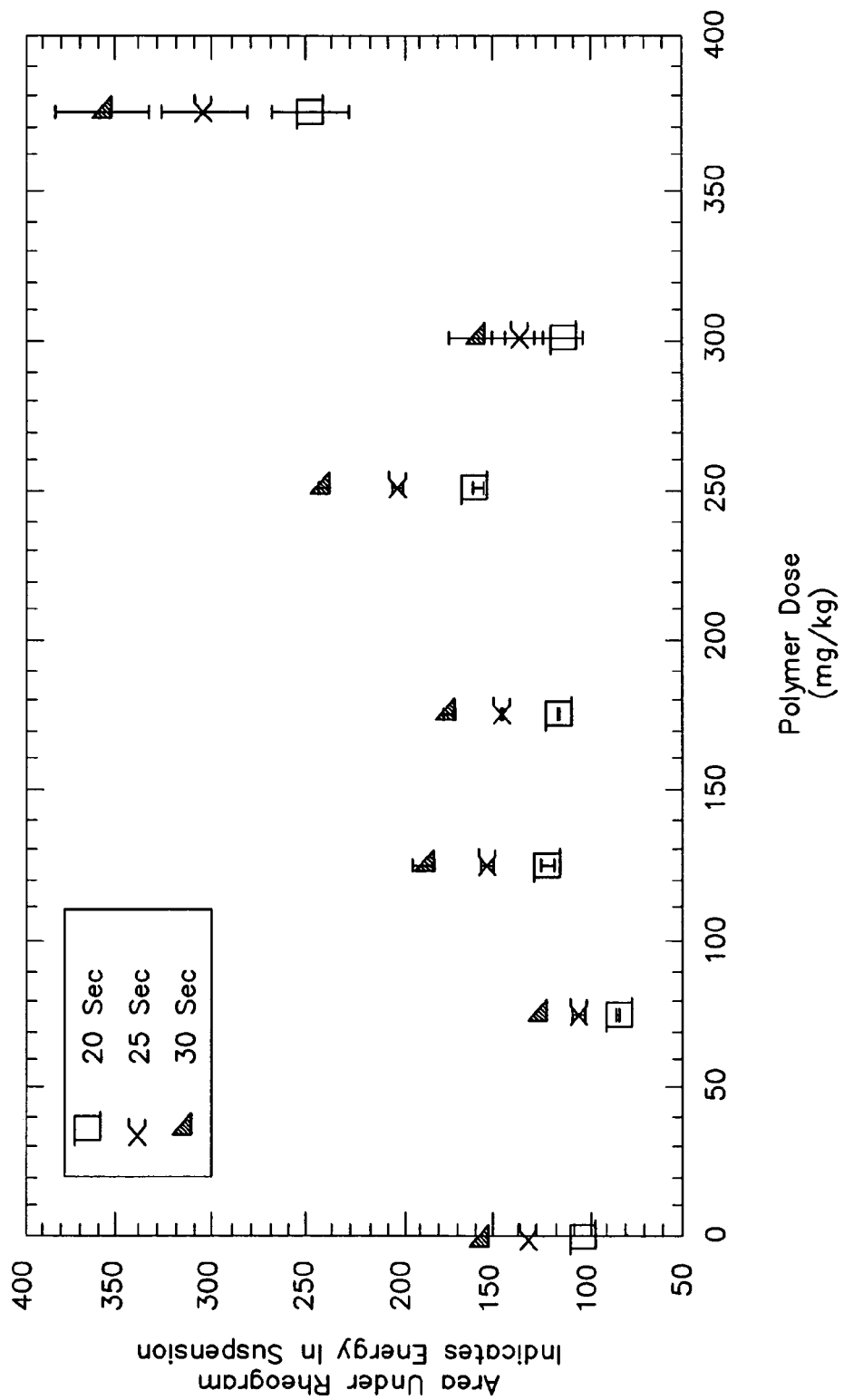
FIG. 8 is a graph characterizing energy as a function of polymer dose.
Figure 8A:
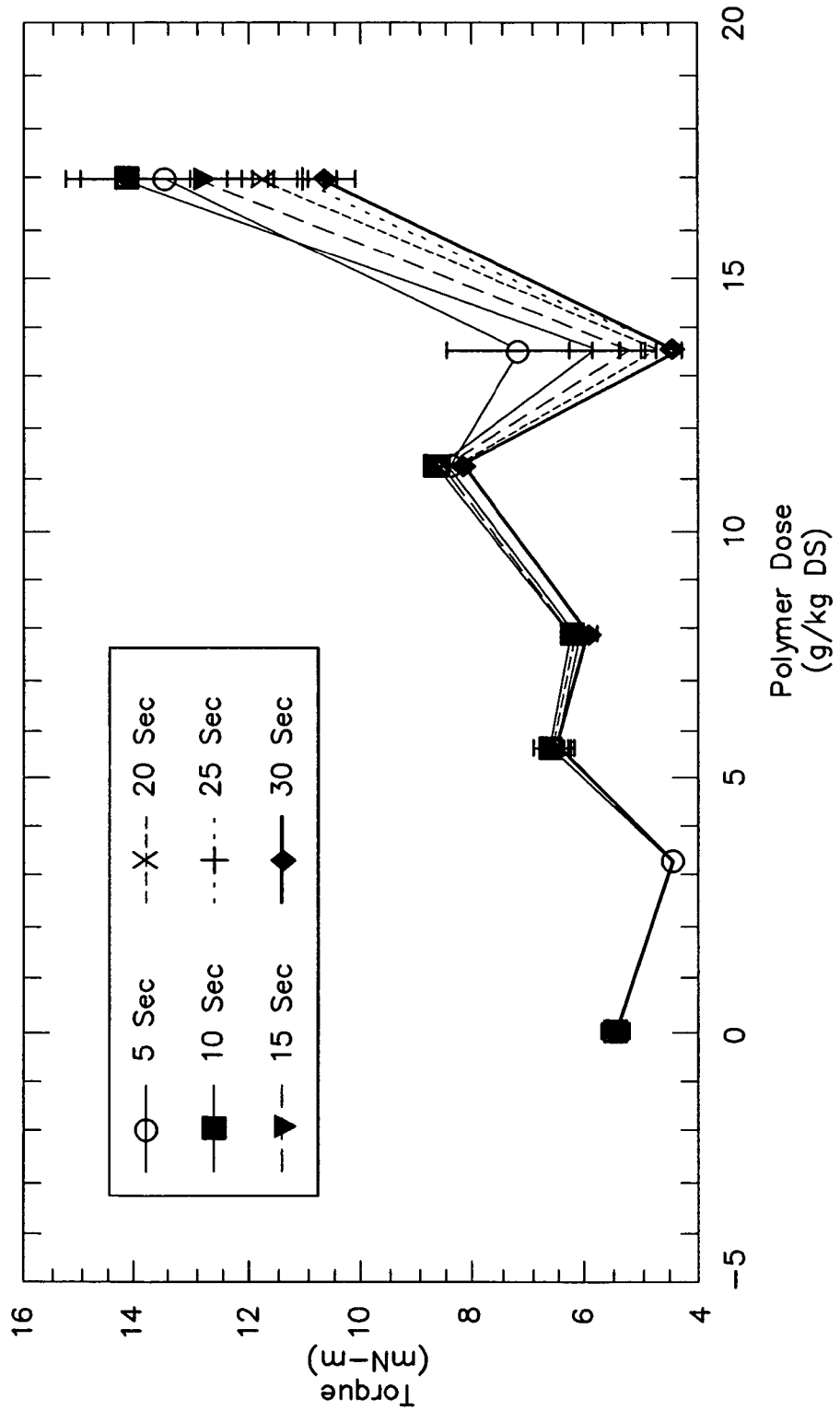
FIG. 8A is a graph showing the measured torque of floc, at different times when generating the rheograms, as a function of the polymer dose.
Figure 9A:
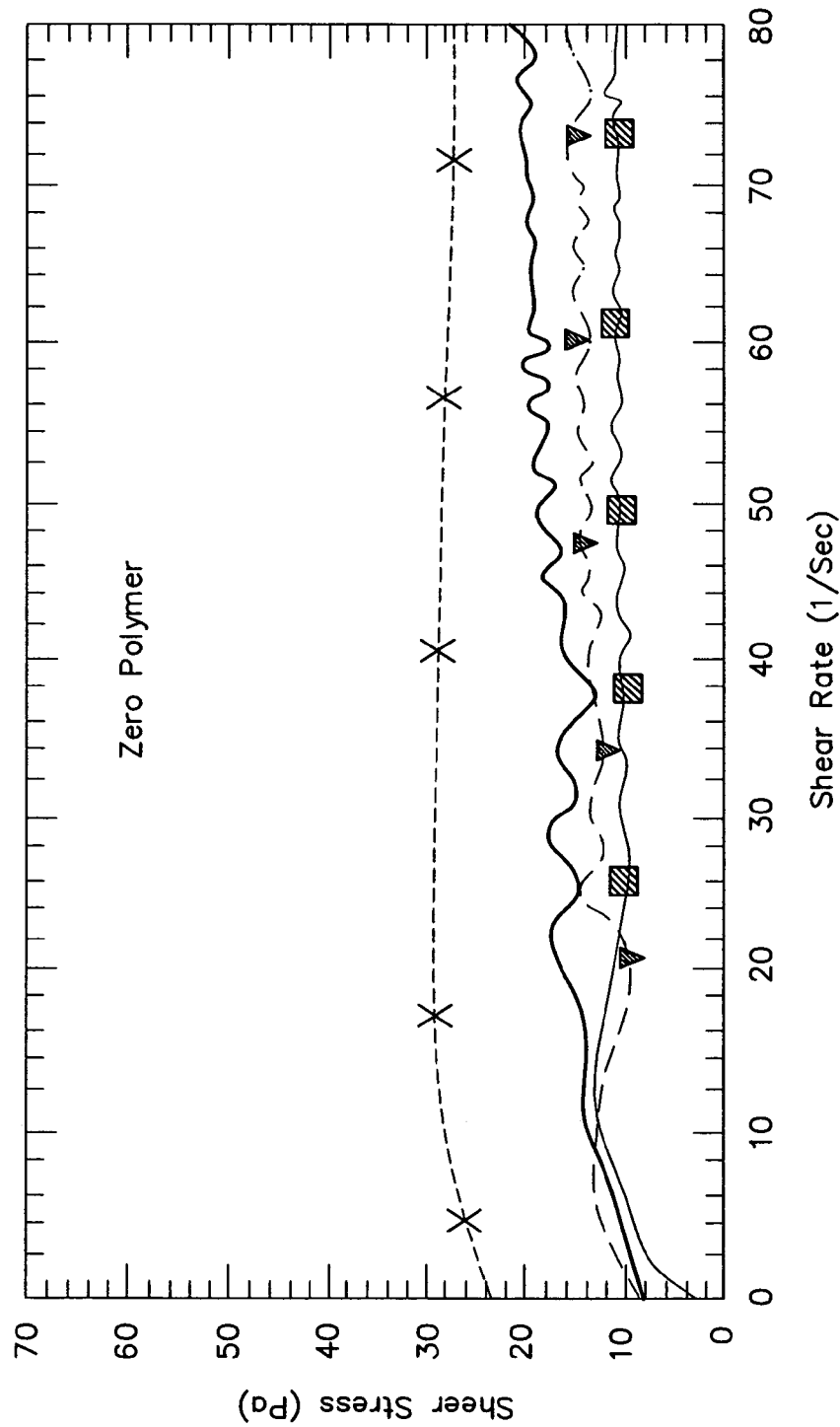
FIGS. 9A–9D are graphs (rheograms) generated using Rotational Instrument (ROTOVISCO viscometer RV 20, with a M5 head, MVIIP sensor, available from Thermal Haake Inc, Germany), the whole sample volume of 55 mL was used after adding 655K polymer, available from Stockhausen, and mixing manually with a metal rod, measurements used by increasing shear rate from 0–100 in 90 sec.
Figure 9B:
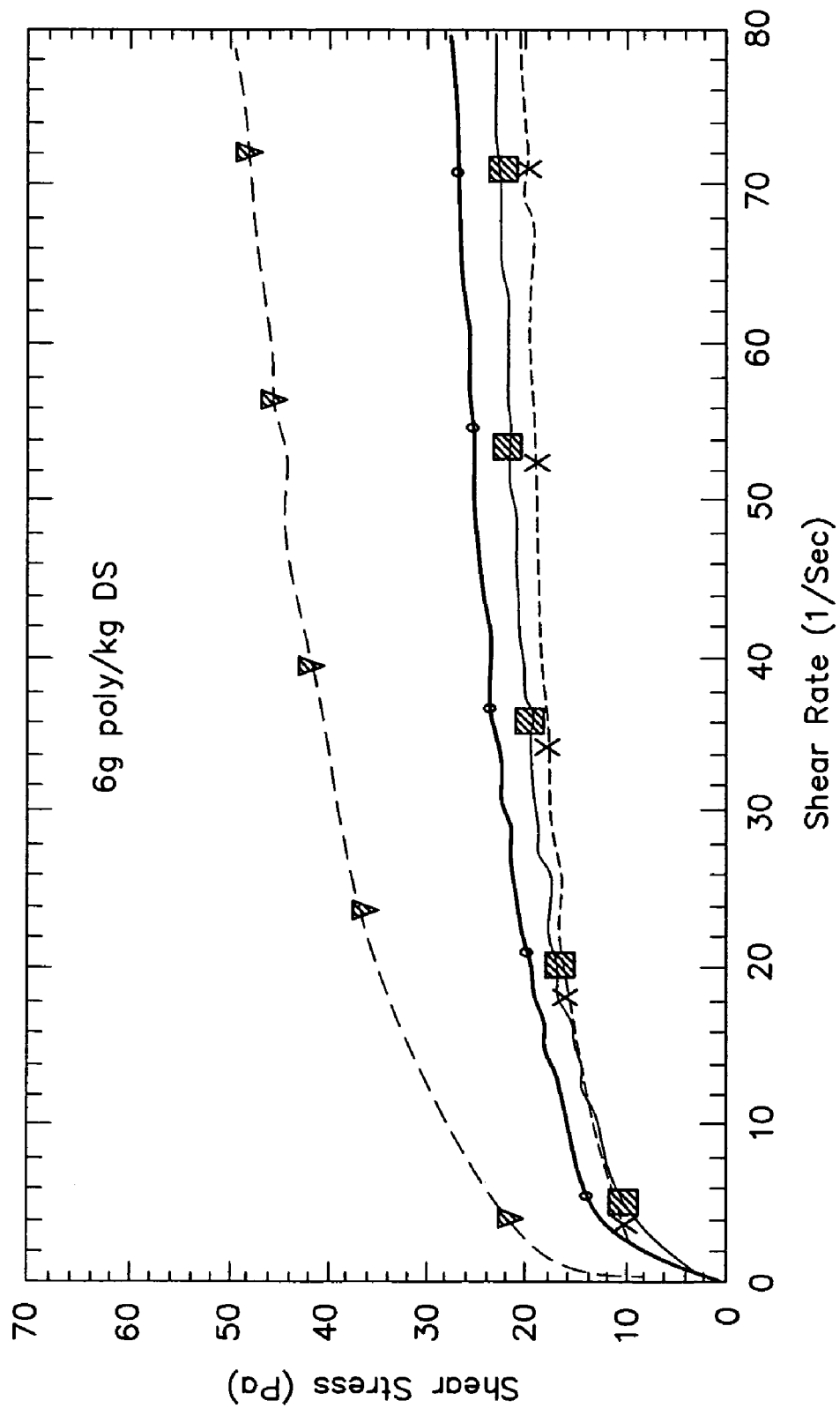
Figure 9C:
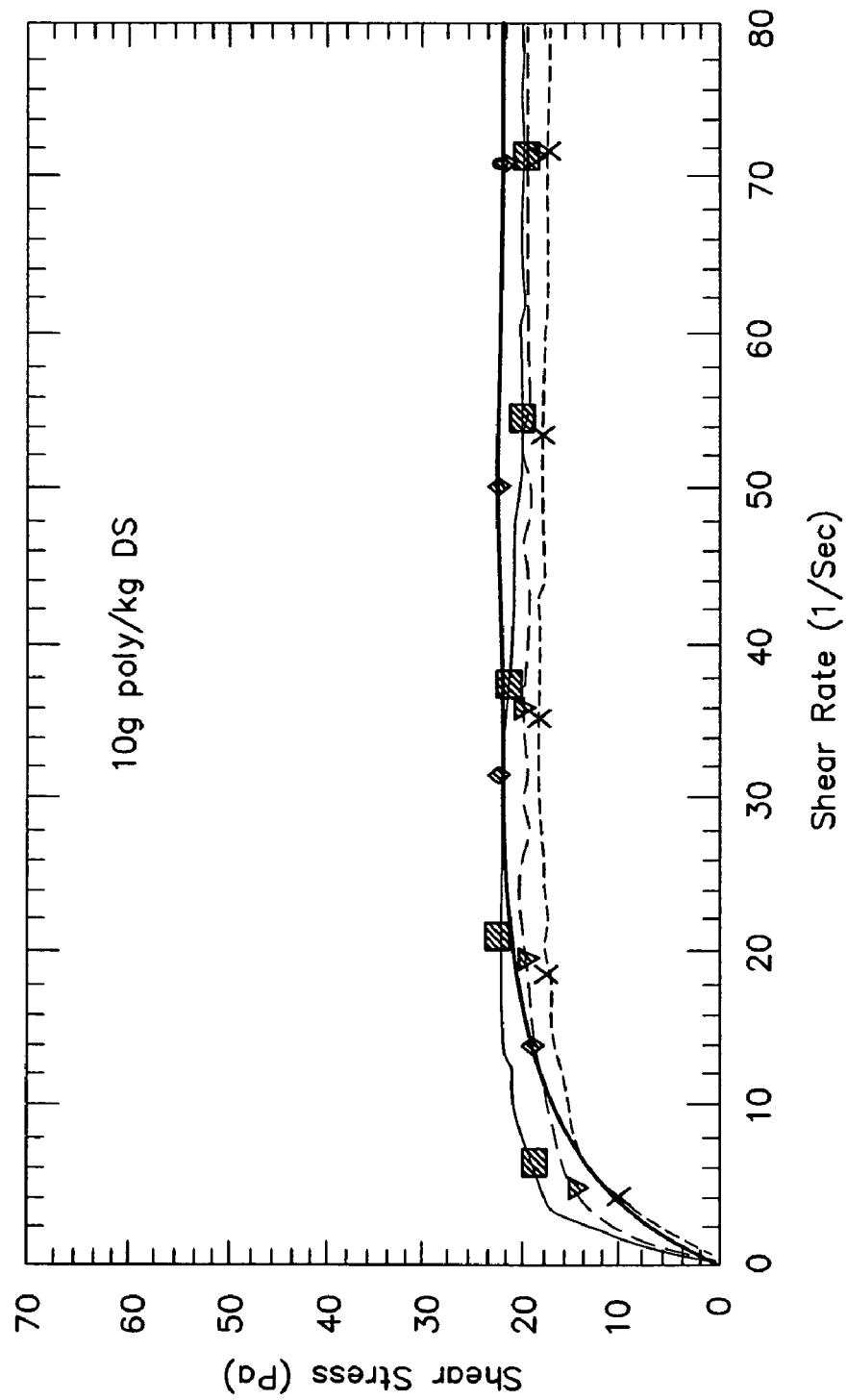
Figure 9D:
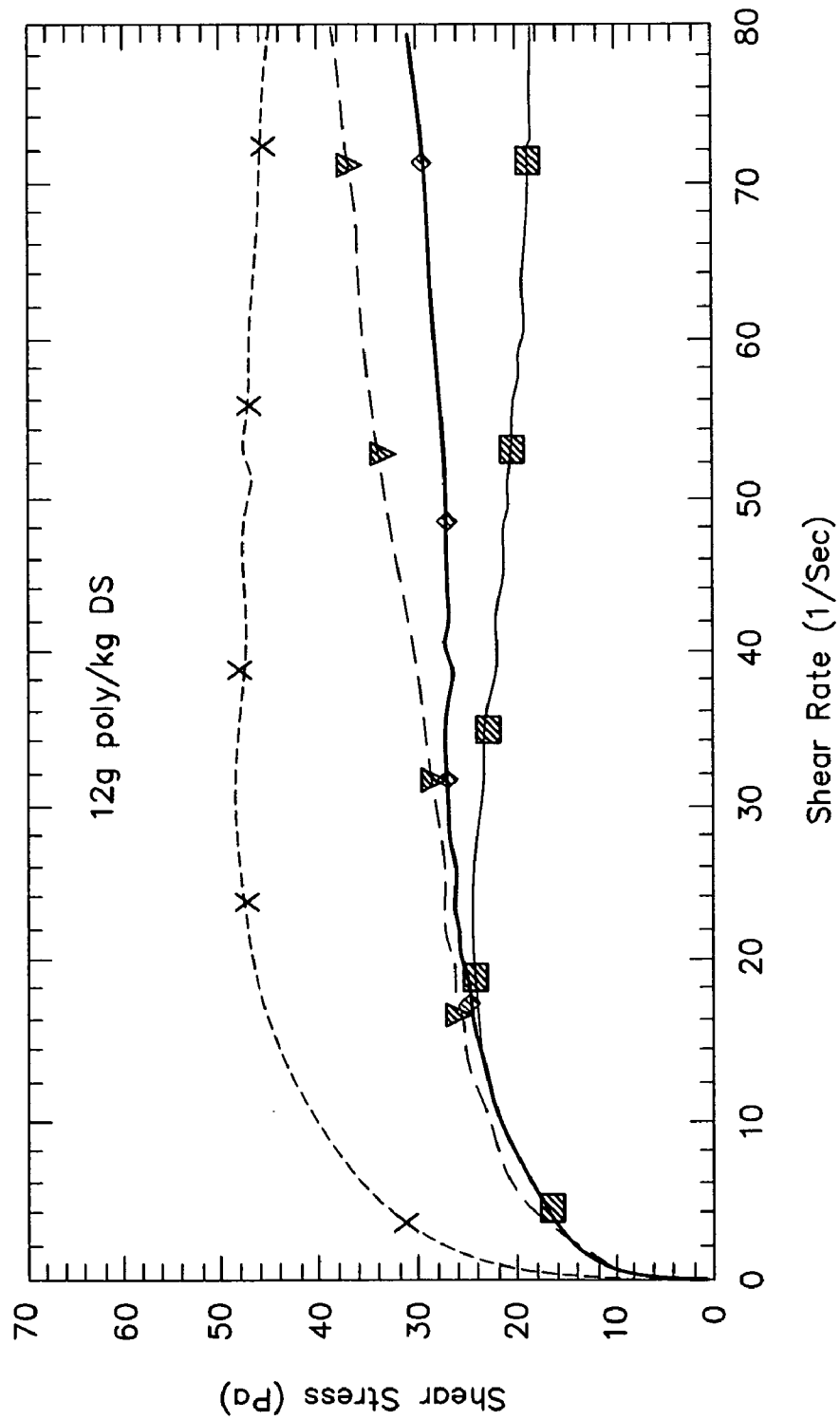

The measured torque can also be utilized to determine the appropriate polymer dose. FIG. 8A, is graph showing the measured torque at various times when generating rheograms of various polymer dose samples. In particular, FIG. 8A shows a decline in the torque measured at about 13.5 g/kg polymer dose, which provides an indication of the optimum or near optimum polymer dose. The thirty-second period measurement for various polymer doses shows a more pronounced profile compared to the other time period measurements.

Thus, the present invention provides utilizing the torque measurement to determine an optimum or near optimum polymer dosage by determining a minimum in the torque-polymer dosage relationship at a predetermined point during torque measurement. FIG. 8A shows that there is a preferred minimum time period during torque measurement. That is, FIG. 8A shows as the time period increases, the relative change in measured torque at the optimum, or near the optimum polymer dose, in this case at about 13.5 g/kg, the magnitude of the change in measured torque increases. However, it is believed that there is a maximum time period during torque measurement should be taken because if the torque is measured after an extended time, the rheograms tend to converge and, consequently, the change in measured torque may decrease such that would be difficult to determine a minimum or inflection.

Figure 10A:
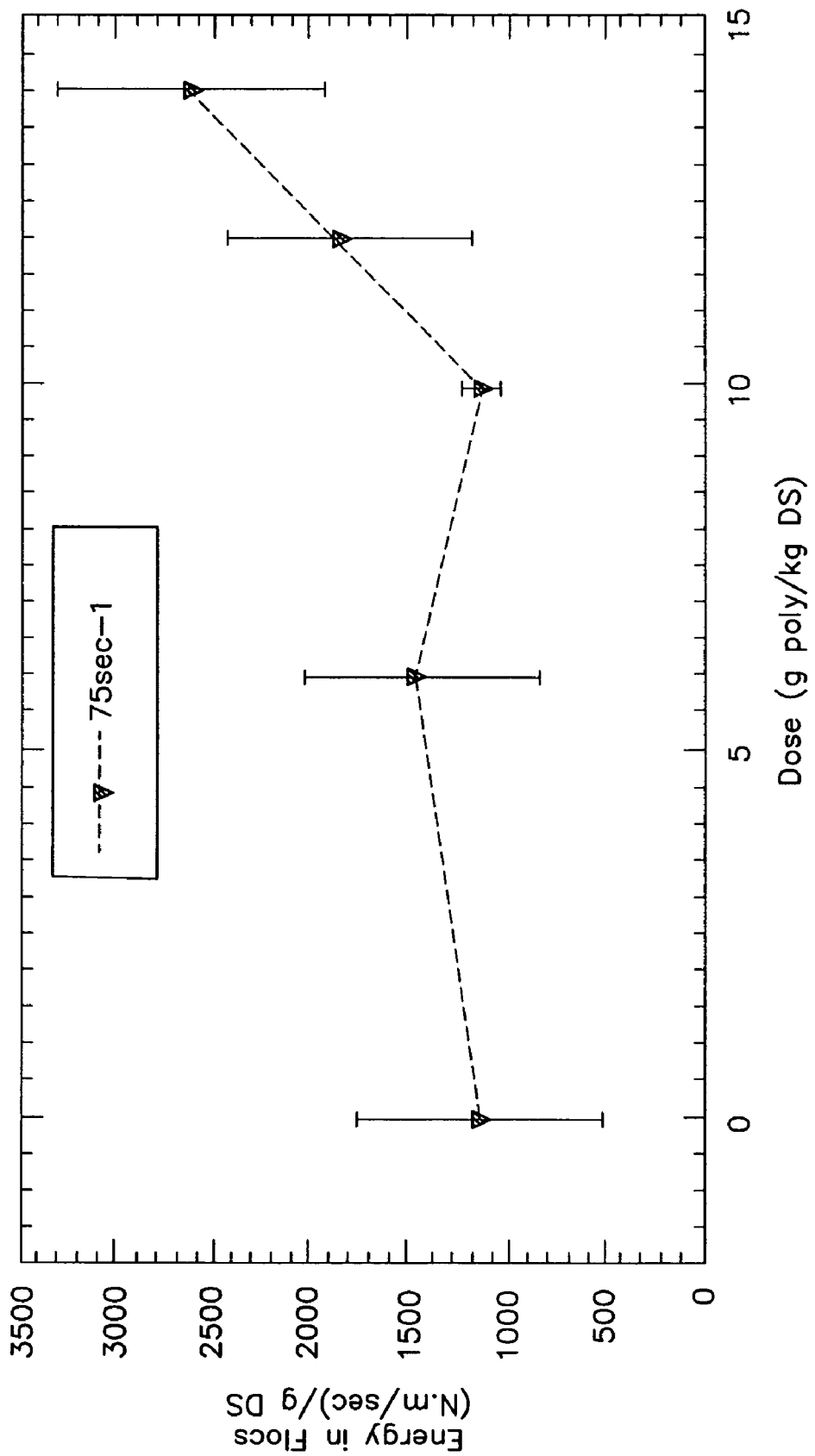
FIGS. 10A–10B are graphs showing the suspension's strength (10A) and capillary suction time (10B) represented by energy in flocs at the 75 sec-1 shear rate as presented in FIGS. 9A–9D.
Figure 10B:
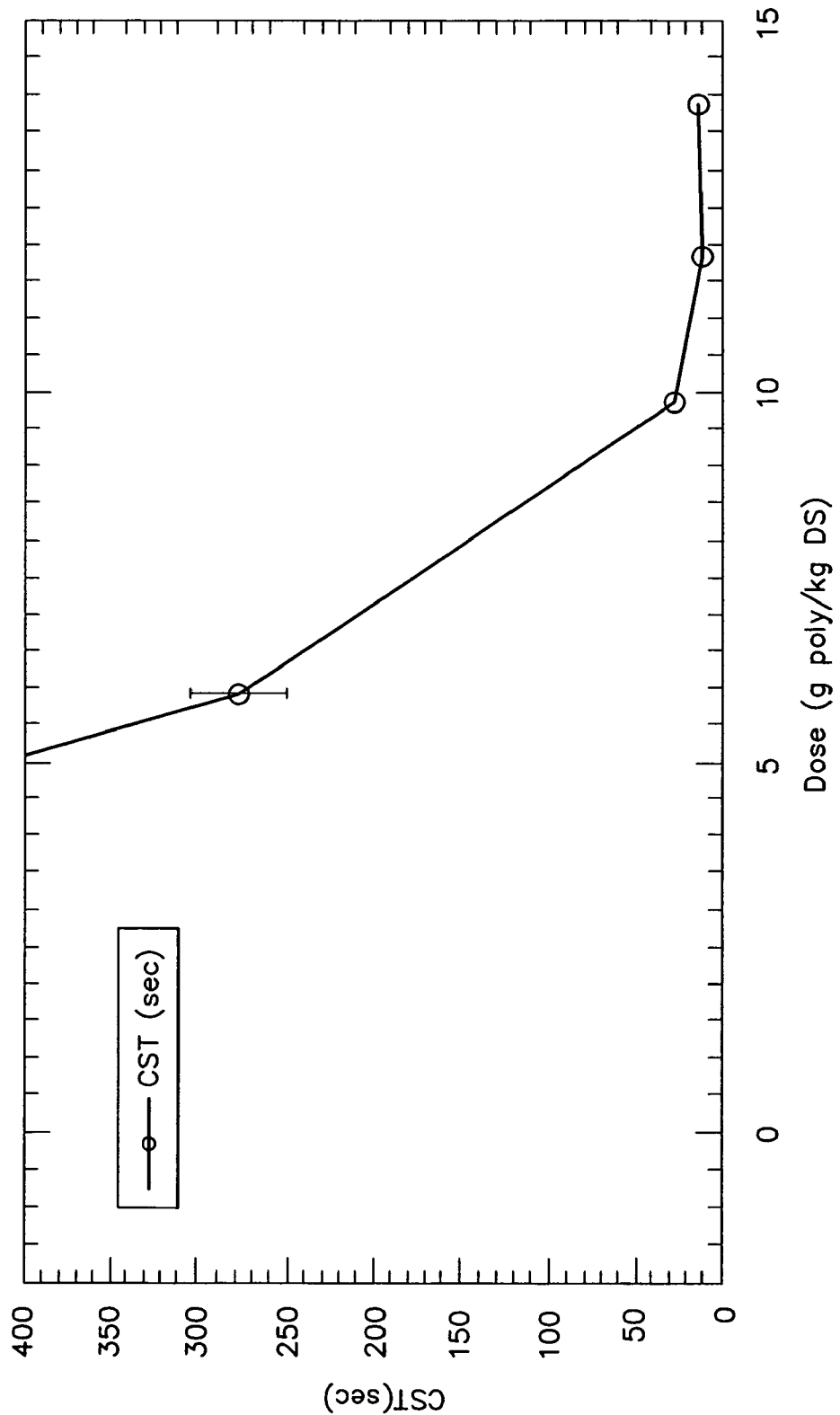

FIGS. 9A–9D show the measured shear stress as a function of shear rate at various polymer dosages for various samples. The data shown in FIGS. 9A–9D were generated using a ROTOVISCO RV20, with a M5 head, MVIIP sensor, from Thermal Haake, Inc. During the measurements, the shear rate was increased from 0–100 sec$^{-1}$ in 90 seconds. FIG. 10A shows the suspension's strength, as energy, at 75 sec$^{-1}$ shear rate as determined in FIGS. 9A–9D. FIG. 10B shows the capillary suction time at various polymer dosages and provides another indication of this optimum dose as shown by the drop in associated energy.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition, any combination of two or more such features, systems or methods, if such features, systems or methods are not mutually inconsistent, is included within the scope of the present invention.

What is claimed is:

1. A method of treating sludge comprising:
   adding a first treating agent dose to a sludge to create a first floc;
   determining a first floc strength by measuring a first area under a torque-time relationship curve of the first floc;
   adding a second treating agent dose to the sludge to create a second floc;
   determining a second floc strength by measuring a second area under a torque-time relationship curve of the second floc;
   characterizing a flocculated suspension network strength-treating agent dose relationship based on the first and second floc strengths and the first and second treating agent doses;
   determining a minimum in the flocculated suspension network strength-treating agent dose relationship; and
   adjusting a third treating agent dose to the sludge based on the minimum.

2. A method of treating sludge comprising providing a controller in communication with a sensor capable of determining a torque of a flocculated suspension, the controller capable of determining a minimum in a flocculated suspension network strength-dose relationship based on torque-time relationship curves of the flocculated suspension at a plurality of treating agent doses, and regulating a dose of a treating agent to the sludge to maintain a minimum in the flocculated suspension network strength-dose relationship.

* * * * *